US010883651B2

(12) United States Patent
Kaufmann

(10) Patent No.: US 10,883,651 B2
(45) Date of Patent: Jan. 5, 2021

(54) MONITOR SYSTEM

(71) Applicant: simtec Systems GmbH, Braunschweig (DE)

(72) Inventor: Bernd Kaufmann, Braunschweig (DE)

(73) Assignee: SIMTEC SYSTEMS GMBH, Braunschweig (DE)

(*) Notice: Subject to any disclaimer, the term of this patent is extended or adjusted under 35 U.S.C. 154(b) by 398 days.

(21) Appl. No.: 15/776,806

(22) PCT Filed: Jan. 5, 2018

(86) PCT No.: PCT/EP2018/050272
§ 371 (c)(1),
(2) Date: May 17, 2018

(87) PCT Pub. No.: WO2018/127563
PCT Pub. Date: Jul. 12, 2018

(65) Prior Publication Data
US 2020/0326032 A1    Oct. 15, 2020

(30) Foreign Application Priority Data

Jan. 6, 2017    (EP) .................................... 17150544

(51) Int. Cl.
| | |
|---|---|
| *F16M 11/20* | (2006.01) |
| *F16M 11/12* | (2006.01) |
| *F16M 11/18* | (2006.01) |
| *F16M 13/02* | (2006.01) |
| *F16M 11/38* | (2006.01) |

(52) U.S. Cl.
CPC ......... *F16M 11/2064* (2013.01); *F16M 11/12* (2013.01); *F16M 11/18* (2013.01); *F16M 11/2092* (2013.01); *F16M 11/38* (2013.01); *F16M 13/022* (2013.01); *F16M 13/027* (2013.01); *F16M 2200/061* (2013.01)

(58) Field of Classification Search
CPC ........... F16M 11/2064; F16M 11/2092; F16M 11/18; F16M 13/027; F16M 11/12; F16M 13/022; F16M 2200/061; F16M 2200/08
USPC ....................................... 248/122.1, 917–924
See application file for complete search history.

(56) References Cited

U.S. PATENT DOCUMENTS

| | | | | |
|---|---|---|---|---|
| 1,611,903 A | * | 12/1926 | Gelb ....................... | F21V 21/14 |
| | | | | 248/590 |
| 4,177,902 A | * | 12/1979 | Winn ................... | G09F 15/0087 |
| | | | | 211/162 |
| 8,596,599 B1 | * | 12/2013 | Carson ................. | F16M 11/041 |
| | | | | 248/429 |

(Continued)

FOREIGN PATENT DOCUMENTS

| | | |
|---|---|---|
| CN | 101543063 A | 9/2009 |
| CN | 102959606 A | 3/2013 |

(Continued)

*Primary Examiner* — Muhammad Ijaz
(74) *Attorney, Agent, or Firm* — W&C IP

(57) ABSTRACT

The invention relates to a monitor system (10) with
(h) a first monitor (12.1),
(i) a second monitor (12.2),
(j) a third monitor (12.3),
(k) at least a fourth monitor (12.4) and
(l) a base (16).
According to the invention, it is intended that
(m) the monitors (12.$i$) are fixed to the base (16) such that they can each be moved by way of a motor in at least two degrees of freedom, and that
(n) the monitors are fixed to the base (16) by means of lazy tong drives.

19 Claims, 10 Drawing Sheets

(56) References Cited

U.S. PATENT DOCUMENTS

Figure 1:
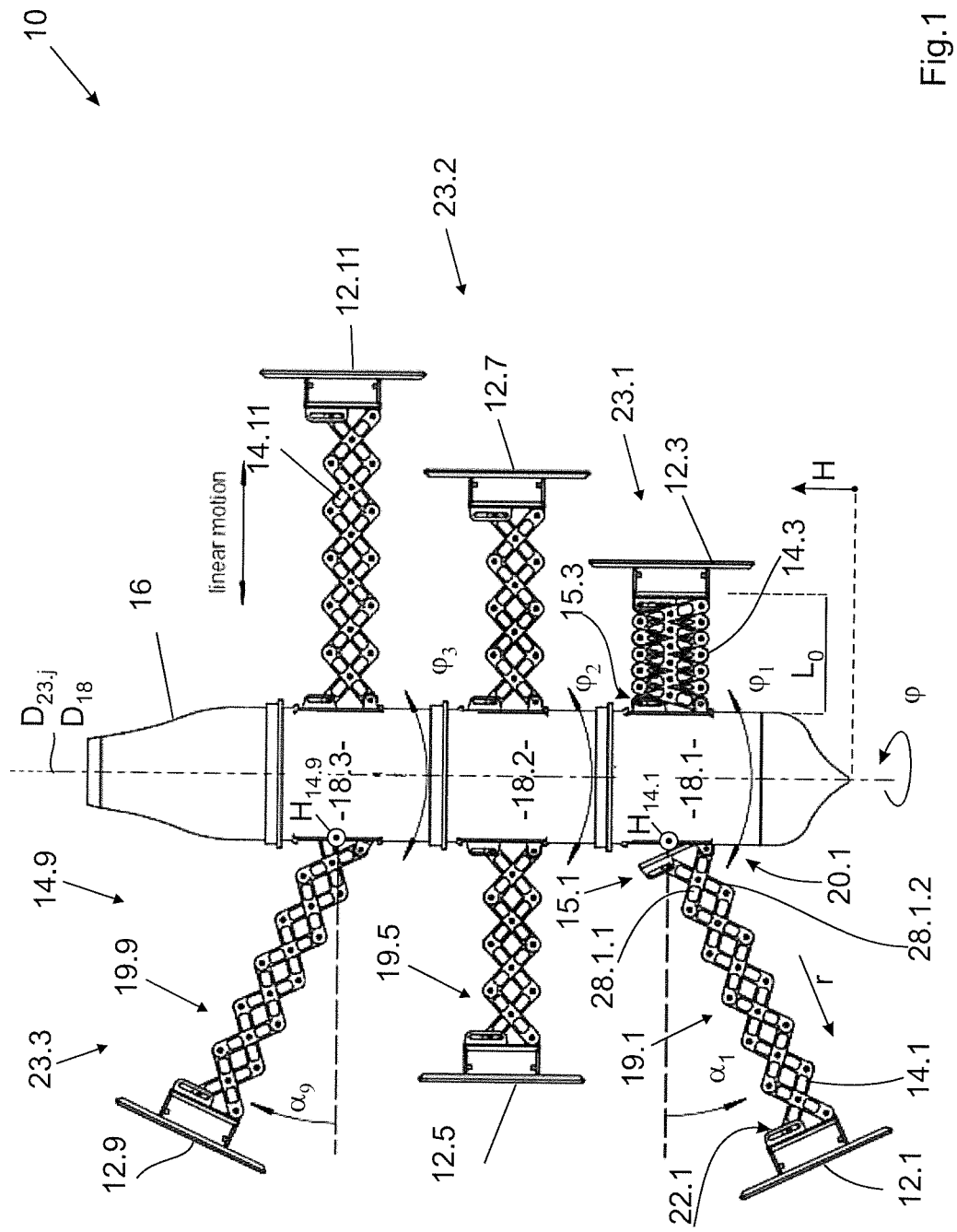

| | | | |
|---|---|---|---|
| 2004/0031893 A1 | 2/2004 | Smed | |
| 2004/0035987 A1* | 2/2004 | Oddsen, Jr. | F16M 11/2092 |
| | | | 248/121 |
| 2009/0050763 A1* | 2/2009 | Dittmer | F16M 11/24 |
| | | | 248/284.1 |
| 2009/0302176 A1* | 12/2009 | Kuroi | G03B 21/58 |
| | | | 248/176.3 |
| 2012/0224311 A1 | 9/2012 | Sutherland | |
| 2012/0241638 A1* | 9/2012 | Cao | A61B 6/4429 |
| | | | 250/393 |
| 2013/0027518 A1 | 1/2013 | Qiang | |
| 2013/0027618 A1* | 1/2013 | Chen | F16M 11/2092 |
| | | | 348/836 |

FOREIGN PATENT DOCUMENTS

| | | |
|---|---|---|
| CN | 105179902 A | 12/2015 |
| KR | 20140073791 A | 6/2014 |

\* cited by examiner

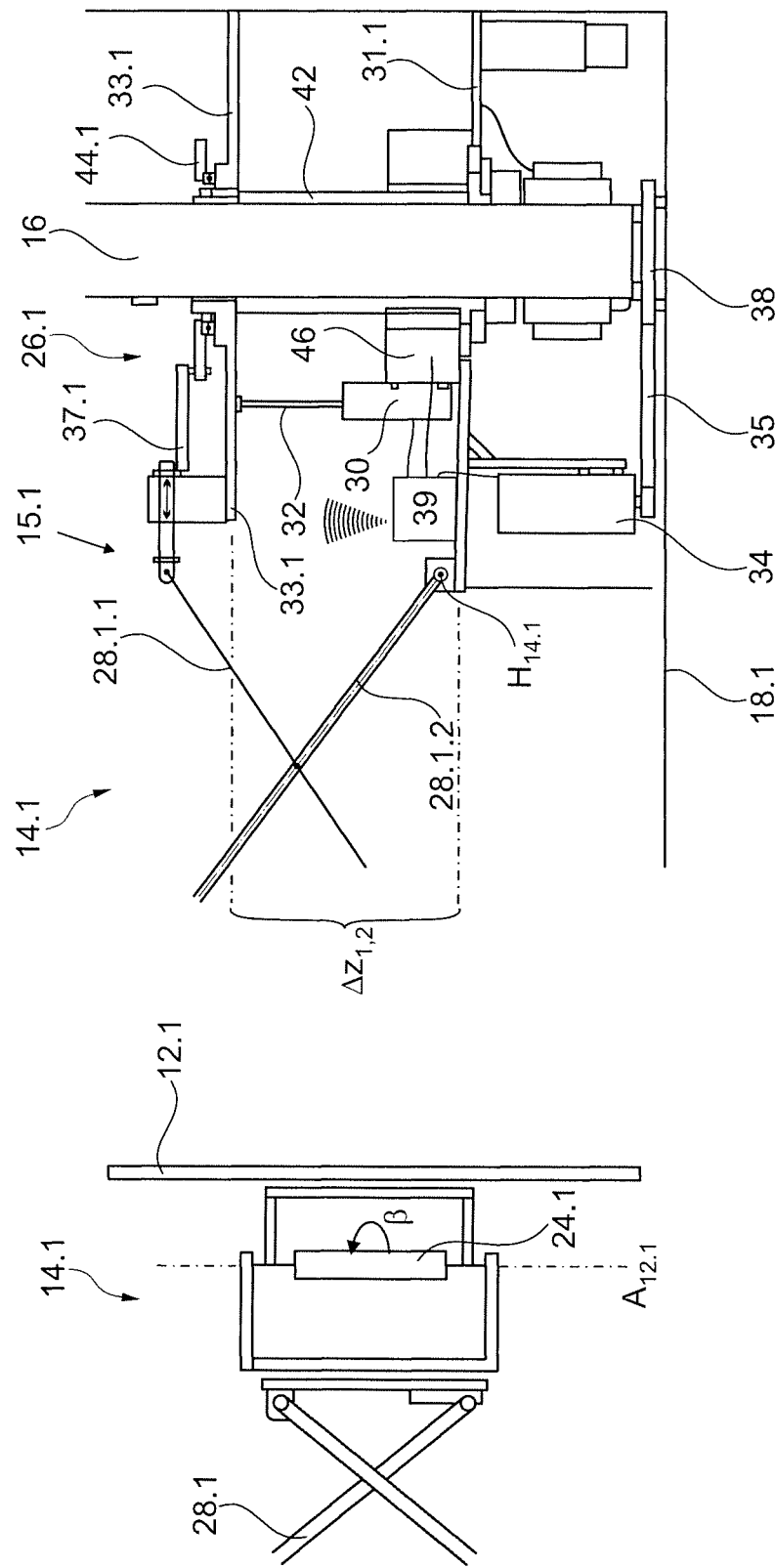

MONITOR SYSTEM

The invention relates to a monitor system with a first monitor, a second monitor, a third monitor and at least a fourth monitor, as well as a base. This type of monitor system is known, for example, as a monitor wall, the purpose of which is to enable the presentation of images or films on large screens without having to expend efforts on producing one large monitor. The disadvantage of this type of system is that they can only hold the attention of a viewer for a limited amount of time.

The invention aims to propose a monitor system that reduces the disadvantages of the prior art.

The invention solves the problem by way of a monitor system according the preamble, the monitors of which are fixed to the base such that they can each be moved by way of a motor in at least two degrees of freedom. The advantage of this is that the additional possibilities for movement of the monitors themselves are able to retain the viewer's attention in a particularly intense manner. Furthermore, it has been proven that the movements depicted on the monitor itself and the movement of the actual monitor are perceived as independent movements, the movement of the monitor itself holding one's attention particularly effectively. The degrees of freedom preferably refer to a rotational degree of freedom for a rotation about the base and a translation degree of freedom relative to a distance of the monitor from the rotational axis of this rotation. It is beneficial if the monitors are fixed to the base such that they can be moved by way of a motor in three degrees of freedom. The third degree of freedom is then the pivot degree of freedom about a pitch angle, which is described in more detail below. Each monitor may also have a yaw degree of freedom.

Within the scope of the present description, the aspect concerning the explicit identification of four monitors should be understood especially to mean that at least four monitors are available. In particular, 6, 8, 9, 10, 11, 12 or more monitors may be provided.

Any use of the indefinite article should be understood to mean that precisely one of the respective object may be available. However, it is also possible that at least one of the respective object is available. In other words, it is possible that two, three or more respective objects are available.

A monitor should be understood particularly to mean a device with a screen which can automatically and actively present images or films, i.e. through the emission of self-generated light. Specifically, a screen is not a monitor. However, it is also possible and included within the invention that, instead of one monitor or several monitors, a screen with a corresponding projector is used in each case.

The base should be understood especially to mean a component that is designed such that it can be rigidly connected to a building or the floor. It is possible, but not necessary, for the base itself to be designed such that it can be moved. In particular, the base is stationary during operation of the monitor system. For example, the monitor system may be attached to the building such that it stands upright or hangs. In particular, the base may be designed as a column.

According to a preferred embodiment, at least one monitor is fixed to the base by means of a lazy tong drive, i.e. a scissor drive. It is especially favourable if two, three or several monitors, in particular the majority of the monitors, are fixed to the base by means of a lazy tong drive. It is particularly preferable for all monitors to be fixed to the base by means of a lazy tong drive.

A lazy tong drive should be understood especially to mean a drive that comprises at least two, preferably at least four or more, zig-zag-shaped connected tong segments. The advantage of a lazy tong drive is that a comparatively modest motor range of a motor of the lazy tong drive, such as a hydraulic cylinder, a pneumatic cylinder, a ball screw or a crank drive, is possible to effect a large range, i.e. a significant change in the projection length of the lazy tong drive. An additional advantage of a lazy tong drive is a particularly large range quotient, wherein the range quotient is calculated using the length when in an extended position as a numerator and a length in a retracted position as a denominator. This enables the monitors to execute particularly impressive movements.

The lazy tong drive preferably has a tong arm comprising several tong segments that are connected in such a way that they are able to pivot relative to one another, thereby rendering a projection length adjustable. The projection length is the length by which the monitor is extended. If the relevant monitor can be rotated about a collective rotational axis, especially a vertical axis, the projection length is the distance to the rotational axis. Every lazy tong drive also has at least one drive. It is possible, but not necessary, for two or more lazy tong drives, in particular all lazy tong drives of a segment, to share a drive.

The lazy tong drive is preferably fixed to the base at a proximal end. The lazy tong drive has a distal end to which the respective monitor is fixed. The monitor is preferably fixed to the distal end such that it can be pivoted about a monitor pivot axis. This feature preferably applies at least for the majority of, in particular for all, lazy tong drives and the corresponding allocated monitors. The feature that the lazy tong drive is fixed to the base at a proximal end should be understood especially to mean that the tong arm is fixed to the base at its proximal end.

The monitor pivot axis then preferably runs vertically when the corresponding tong arm extends in the horizontal direction. The monitor pivot axis preferably runs transversely, in particular horizontally, to an extension direction of the tong arm.

It is especially beneficial if the monitor is fixed such that it can be yawed by at least ±45° about the monitor pivot axis. In this case, an angle between the two extreme positions relative to the yaw movement is at least 90°. It has been proven that this enables the generation of particularly attractive movement patterns.

The lazy tong drive is preferably fixed to the base such that it can be automatically pivoted about a horizontal lazy tong drive pivot axis. The horizontal distance between the monitors can then be varied. The feature that the lazy tong drive is fixed to the base such that it can be pivoted about a horizontal lazy tong drive pivot axis should be understood particularly to mean that there is an imaginary—and, if necessary, temporally changing—pivot axis about which the monitor can be pivoted by means of the lazy tong drive. In other words, a pitch angle a, formed by the tong arm and the horizontal, can be altered by activating a motor.

The monitor system preferably comprises a first monitor group which has at least three, especially at least or exactly four, monitors, that are collectively fixed to the base such that they can be rotated, wherein the monitor system comprises a second monitor group which has at least three, especially at least or exactly four, monitors that are collectively fixed to the base such that they can be rotated. It is particularly preferable if the monitor system has a third monitor group which comprises three, especially at least or exactly four, monitors that are collectively fixed to the base such that they can be rotated. This kind of collective rotatability enables the monitors to move in a way that increases one's attention, which is not possible with current monitor systems.

It is particularly beneficial if the monitor system comprises a first segment that is fixed to the base such that it can be automatically rotated about a vertical axis and to which the monitors in the first monitor group are fixed, and a second segment that is fixed to the base such that it can be automatically rotated about the same vertical axis, to which the monitors in the second monitor group are fixed and that is arranged above the first segment. The feature that the first segment can be automatically rotated should be understood especially to mean that a motor exists by means of which the segment can be rotated.

It is especially beneficial if the monitor system has a third segment which: is attached to the base such that it can be rotated about the vertical axis, to which the monitors in the third monitor group are attached, and that is arranged above the second segment. In other words, the monitors are fixed to the base by means of the respective segments.

A segment should be understood particularly to mean a component with a ring-type or ring-shaped form which encircles the base. This type of structure is particularly stable and robust. However, it is also possible that the segments are designed to be C-shaped or another shape.

The monitors in the first monitor group are preferably mounted such that they can be rotated about a common segment rotational axis and that each can be moved, using a motor, by means of a lazy tong drive. In this case, it is advantageous if all of these lazy tong drives have a common first drive unit. This should be understood especially to mean that there is only one motor, in particular an electric motor, by means of which all the monitors in the first monitor group can be moved in a manner that facilitates synchronisation. In particular, the lazy tong drives are designed such that a centre of gravity of the monitors that occurs while the lazy tong drives are being retracted and extended remains predominantly unchanged. Hydraulic motors may also be used as an alternative to electric motors.

The monitor system (preferably for each segment if there are at least two segments available) preferably comprises a first platform, at least a second platform and a drive unit, by means of which the two platforms can be moved axially relative to one another or in the direction of rotation, wherein this axial movement or the rotational movement leads to a change in the projection length of the tong arm of the lazy tong drive that is fixed to the segment.

The monitor system (preferably for each segment if there are at least two segments available) preferably comprises a third platform that is fixed axially or in the direction of rotation relative to one of the other platforms, wherein this axial movement or the rotational movement leads to a change in the pitch angle of the arm of the lazy tong drive that is fixed to the segment.

If—as is the case according to a preferred embodiment—the monitor system has two or more segments, wherein exactly one group of monitors is attached to each segment, each segment preferably comprises at least two, in particular three, platforms and a drive unit for moving the first and second platforms relative to one another, and a drive unit for moving the first and third platforms relative to one another.

It is especially beneficial if the first drive unit comprises a first drive, in particular a first crank drive, by means of which a first axial distance of a first platform from a second platform can be adjusted, wherein the lazy tong drives are at least also connected to the first platform at a first foot point of their tong arm, and wherein the lazy tong drives are at least also connected to the second platform at a second foot point of their tong arm such that the tong arm can be retracted and extended by means of the first drive, in particular by means of the first crank drive.

A platform should be understood especially to mean a component or an assembly of connected components that can be moved collectively.

The feature that the lazy tong drives are at least also connected to the first platform at a first foot point to the first platform should be understood especially to mean that it is possible that the foot points are also connected to another, in particular a third, platform. It is also possible for the foot points to be connected to a component which is fixed to the first platform.

The tong arms are preferably connected to the first platform at their respective first foot point by means of a pivot lever. In this case, it is beneficial if the first drive unit comprises a second drive, in particular a second crank drive, by means of which a pivot angle of the pivot lever can be adjusted such that the lazy tong drives can be collectively pivoted about a pitch angle.

It is preferable if the monitor system comprises a third platform which can be moved independently from the first platform and the second platform. In this case, it is beneficial if the pivot lever is hinged on the third platform, wherein an axial distance between the third platform and the first platform can be adjusted by means of the second drive, especially the second crank drive. The adjustment of the axial distance between the third platform and the first platform thus enables the adjustment of the projection length of the tong arm.

The three platforms can preferably only be moved towards one another in the axial direction.

Preferably, (a) the first crank drive (i) comprises an electric motor that is fixed to the first platform, (ii) a first bevel gear with a first crown gear, a first first-crank-drive bevel wheel and a second first-crank-drive bevel wheel, (iii) a first first-crank-drive crank that is fixed to the first first-crank-drive bevel wheel such that it is torque-proof, and (iv) a second first-crank-drive crank that is fixed to the first first-crank-drive bevel wheel such that it is torque-proof, (v) a first first-crank-drive connecting rod that is connected at a first end to the first first-crank-drive crank and at a second end to the second platform, and (vi) a second first-crank-drive connecting rod that is connected at a first end to the first first-crank-drive crank and at a second end to the second platform, wherein (b) the first electric motor is connected to the first crown gear to drive the system such that the first-crank-drive cranks can be rotated by means of the first electric motor, and that (c) the first-crank-drive cranks are connected to the respective bevel wheels such that the first first-crank-drive crank is at its top dead centre point when the second first-crank-drive crank is at its top dead centre point, and that the first first-crank-drive crank is at its bottom dead centre point when the second first-crank-drive crank is at its bottom dead centre point. It should be noted that, according to the general remark above, it possible but not necessary for there to be precisely two first-crank-drive bevel wheels available: however, there may also be three or more first-crank-drive bevel wheels provided.

The two first-crank-drive bevel wheels preferably lie exactly opposite one another. The advantage of this type of crank drive is that the extreme positions, i.e. when the cranks are at their top and bottom dead centre points, can be held without having to expend much or unnecessary energy. The monitors in a large number of applications are in one of the two extreme positions most of the time. In this case, it is beneficial to consume as little power as possible in these positions. In particular, the resulting heat loss is also small. This prevents the drives from heating up and increases the service life.

The feature that the first cranks are exactly at their top/bottom dead centre point when the second cranks are at their corresponding points should be understood especially to mean that the angular positions at which each top dead centre point is reached differ by a maximum of 2°, especially 1°. This enables the high quality synchronisation of the movements of the monitors that are being driven. This ensures that the centre of gravity of the group of monitors does not change when it is retracted and extended, which increases the level of safety. Furthermore, the monitors can be rotated about a common segment rotational axis without the emergence of forces resulting from an acentric bearing.

It is especially beneficial if (a) the second crank drive comprises (i) a second electric motor (below), (ii) a second bevel gear with a second crown gear, a first second-crank-drive bevel wheel and a second second-crank-drive bevel wheel, (iii) a first second-crank-drive crank that is fixed to the first second-crank-drive bevel wheel such that it is torque-proof, and (iv) a second second-crank-drive crank that is fixed to the second second-crank-drive bevel wheel such that it is torque-proof, (v) a first second-crank-drive connecting rod that is connected at a first end to the first second-crank-drive crank and at a second end to the third platform, and (vi) a second second-crank-drive connecting rod that is connected at a first end to the second second-crank-drive crank and at a second end to the third platform, wherein (b) the second electric motor is connected to the second crown gear to drive the system such that the second-crank-drive cranks can be rotated by means of the second electric motor, and that (c) the second-crank-drive cranks are connected to the respective bevel wheels such that the first second-crank-drive crank is at its top dead centre point when the second second-crank-drive crank is at its top dead centre point, and that the first second-crank-drive crank is at its bottom dead centre point when the second second-crank-drive crank is at its bottom dead centre point. This renders it possible to synchronously adjust the pitch angles of all the monitors. The two second-crank-drive bevel wheels preferably lie exactly opposite one another.

It is beneficial to use two or three cranks, depending on the arrangement. This prevents any jamming, as well as creating additional stability in the case of three cranks. Four cranks may lead to a mechanically overdetermined system.

It is especially favourable if a distance of the first crown gear from the second crown gear is smaller than 1.5 times the diameter of the first-crank-drive bevel wheel. In other words, the first crank drive and the second crank drive are nested, which reduces the overall height.

The lazy tong drives and/or the crank drive bevel wheels are preferably structurally identical. This reduces the complexity of their production.

It is especially favourable if the first crown gear is driven by means of a gearwheel with a face spline. This spur gear may be part of a reduction drive.

The monitor system preferably has an electric control system that is connected to all drives in the monitor system in order to drive and/or control it. The term control should be understood especially to mean a feedback control according to the use of the term is of control technology. It is beneficial if the control unit is installed to automatically conduct a method containing the steps (i) moving the monitors from a first configuration into a second configuration. Alternatively or additionally, the control unit is designed to automatically rotate at least one segment, especially all segments, about a segment rotational axis.

In the first configuration of at least one monitor group, a first monitor and a second monitor are preferably arranged side-by-side, wherein the monitors point in a first direction, wherein a third monitor and a fourth monitor are arranged side-by-side and point in a second direction that is in the opposite direction to the first direction, wherein a first lazy tong drive, with which the first monitor is fixed, and a third lazy tong drive, with which the third monitor is fixed, extend in the opposite direction to that direction, and wherein a second lazy tong drive, by means of which the second monitor is fixed, and a fourth lazy tong drive, by means of which the fourth monitor is fixed, also extend in the opposite direction. This enables the presentation of images in two opposite directions.

It should be noted that the control unit is generally configured to automatically move the monitors in a sequence of configurations according to a pre-set programme. Within the scope of the programme, the monitors can be moved into three, four, five or more configurations.

The lazy tong drives can preferably be put in a retracted position and an extended position, wherein the lazy tong drives of the corresponding monitor group, when in the retracted position, are a maximum of 25% of the range away from the retracted position. The range is the difference between the extended position and the retracted position.

A side-by-side arrangement should be understood especially to mean that the monitors sit flush, with their narrow sides horizontally next to one another, at a particular height, wherein the distance between two adjacent monitors has a maximum value of 1/10, preferably a maximum of 1/20, of their width. The opposite direction should be understood especially to mean that an angle between the two directions has a value of 180°±10°. When in the retracted position, the lazy tong drives are at their minimum length: in the extended position, the lazy tong drives are at their maximum length.

It is particularly favourable if the direction of extension of the lazy tong drives forms a maximum angle of 10° with the horizontal when the monitors are in the first configuration.

For instance, it is possible that the monitors in a monitor group in the second configuration point in four directions that are arranged at a right angle. A right angle should be understood especially to mean an angle of 90°±5°. Additional configurations are presented in the description of the figures.

The lazy tong drives are preferably each fixed to the base, especially the segment, by a foot section. The foot sections of the lazy tong drives of the monitors in a monitor group are preferably arranged at the same height.

The lazy tong drives that are fixed to the second segment and, if available, the lazy tong drives that are fixed to the third segment are preferably designed such that a downward movement of the monitors can be ruled out. This reduces the risk of the monitors colliding with one another. For the same reason, it is favourable if the lazy tong drives fixed to the first segment and preferably also the lazy tong drives fixed to the second segment are designed such that an upward movement of the monitors can be ruled out.

The monitors in the second monitor group are preferably at the smallest possible horizontal distance from the monitors in the third monitor group when the lazy tong drives extend in the horizontal direction. The advantage of this is that it also reduces the risk of collision.

The lazy tong drives, when in the retracted position, preferably have an overall length, wherein the monitor system comprises at least one yaw motor for yawing the at least one monitor about the monitor pivot axis and wherein the overall length and an angle range of the at least one yaw motor are selected such that any contact between two adjacent monitors in a monitor group can be ruled out, regardless of a yaw angle position.

The monitors are preferably fixed rigidly to the base in terms of a pivot movement about a horizontal pivot axis.

In order to further reduce the likelihood of two monitors colliding, the monitors are preferably rigidly fixed to the base in terms of a rotational movement about a horizontal roll axis. In other words, the monitors cannot execute any rotational movements about the roll axis.

The control system is preferably designed such that a simultaneous pitch movement of the lazy tong drives and a yaw movement of the monitors is ruled out.

Specifically, the control systems is designed such that the rotational frequency of the motors, and therefore e.g. of the segments about the base, does not exceed a respective pre-set maximum rotational frequency.

The electric control system is preferably designed for the automatic control of the lazy tong drives so that a centre of gravity of the monitors in the first monitor group, preferably in all monitor groups, lies constantly within the base. This prevents the occurrence of overturning moments on the base.

The invention also includes a building with a monitor system according to the invention, wherein the base is fixed to a ceiling of the building, to a mast or to a foot on the ground. Alternatively, the base is fixed to a frame that is, for instance, temporarily erected or hung.

In the following, the invention will be explained in more detail by way of the attached drawings. They show FIG. 1 a schematic diagram according to the invention of a monitor system from a lateral perspective, FIG. 2 a schematic view of the monitor system according to FIG. 1, FIG. 3 a schematic view from above of a monitor in the monitor system according to FIG. 1, FIG. 4 a schematic view of the monitor system, FIG. 5a a schematic view of a yaw motor of the monitor system, FIG. 5b a schematic view of the lazy tong drive of the monitor system according to FIG. 1, which FIGS. 6a, 6b, 6c and 6d depict the monitor system in a range of configurations, FIG. 7 shows a cross-section through a segment unit of the monitor system according to the invention that contains a group of monitors, FIG. 8 a perspective partial view of the segment unit according to FIG. 7, FIG. 9 a sectional view of the segment unit according to FIGS. 7 and 8, FIG. 10 a lateral view of the first crank drive of the segment unit, FIG. 11 the second crank drive of the segment unit and FIG. 12 the view of the segment unit according to FIG. 8 with fewer components than in FIG. 8.

FIG. 1 shows a monitor system 10 according to the invention, which comprises a number of monitors 12.$i$ ($i$=1, 2, ..., N). The number N of the monitors may be 16, for instance. For the sake of clarity, the monitors 12.2, 12.6 and 12.10 are not depicted in FIG. 1. Any reference without a numerical suffix refers to all relevant objects. The monitors 12.$i$ are fixed to a base 16 such that they can each be moved by way of a motor in at least two degrees of freedom, in the present case by three degrees of freedom. For instance, the monitor 12.1 can be rotated about a pitch angle $\alpha_1$ and an angle of rotation $\varphi$ as well as moved in a longitudinal direction r.

The monitors, especially the monitor 12.1, are each fixed to a base 16 with a lazy tong drive 14.1. In the present case, certain sections of the base 16 are cylindrical.

In the embodiment depicted in FIG. 1, the lazy tong drives 14 are fixed to the base 16 by means of a segment 18.1, 18.2 or 18.3, respectively. The segments 18.$j$ ($j$=1, 2, 3) can be rotated about the base 16 independently of one another by means of a motor (not depicted). This means that the segment 18.1 can be rotated about an angle of rotation $\varphi_1$ about a vertical axis $D_{18}$ about the base 16, wherein this angle of rotation $\varphi_1$ may correspond to an angle of rotation $\varphi_2$ of the second segment 18.2. However, this is not necessary.

Each lazy tong drive 14.1 has an arm 19.1 that has a proximal end 20.1, at which it is fixed to the respective segment 18.$j$, as well as a distal end 22.$i$ to which the respective monitor 12.$i$ is fixed. The area of the proximal end 20.$i$ may also be referred to as a foot section. The lazy tong drive of the monitor 12.3 is shown in its retracted position in which it has an overall length $L_0$.

Each segment 18.$j$ forms a segment unit 23.$j$ ($j$=1, 2, 3) with the lazy tong drive 14.$i$ attached to it. Each segment unit 23.5 can be rotated about a segment unit rotational axis $D_{23.j}$. In the present embodiment, all segment units 23.$j$ can be rotated about a common rotational axis $D_{18}$. However, it is also possible that the segment unit rotational axes $D_{23.5}$ run parallel, but not coaxially.

Figure 3:
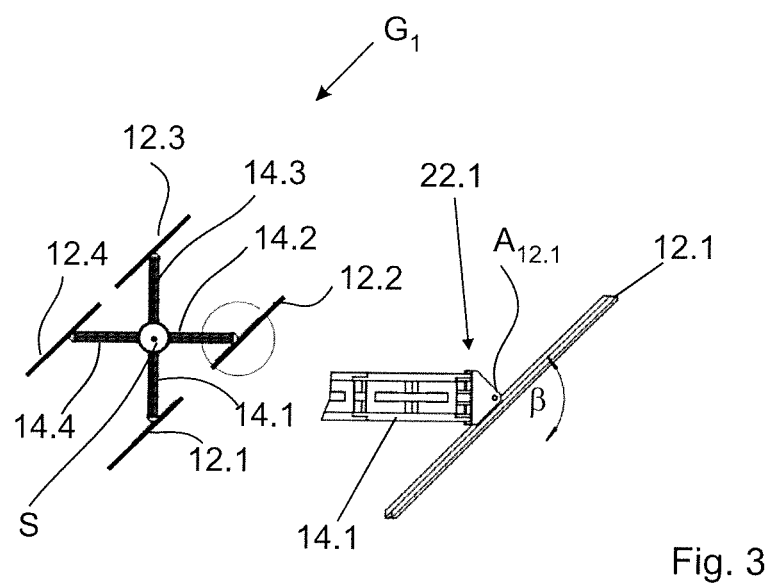

FIG. 3 shows a view from above of the monitor system 10. The partial image on the right demonstrates that the monitors 12.$i$, for example the monitor 12.1, can be pivoted about a yaw angle $\beta$ about a vertical monitor pivot axis $A_{12.1}$ by means of a yaw motor (not depicted).

FIG. 3 also shows that the monitors 12.1, 12.2, 12.3 and 12.4 form a first group G1 that is fixed to a first segment 18.1. In terms of surface area, the monitors 12.5, 12.6, 12.7 and 12.8, which are fixed to the second segment 18.2, form a second group G2, and the monitors 12.9, 12.10, 12.11 and 12.12, which are fixed to the third segment 18.3, form a third group G3. By rotating the respective segment 18.$j$, each of the groups G is collectively fixed to the base such that it can be rotated about the horizontal rotational axis $D_{18}$. All the monitors in a group are preferably arranged at the same axial height H.

Figure 2:
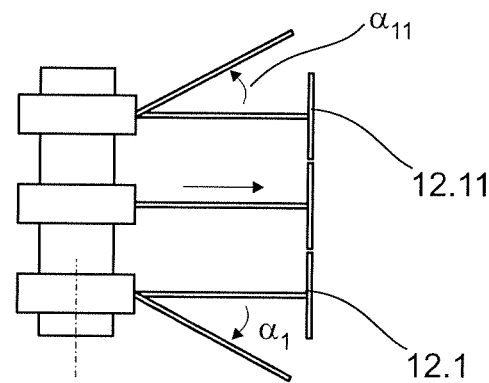
Figure 4:
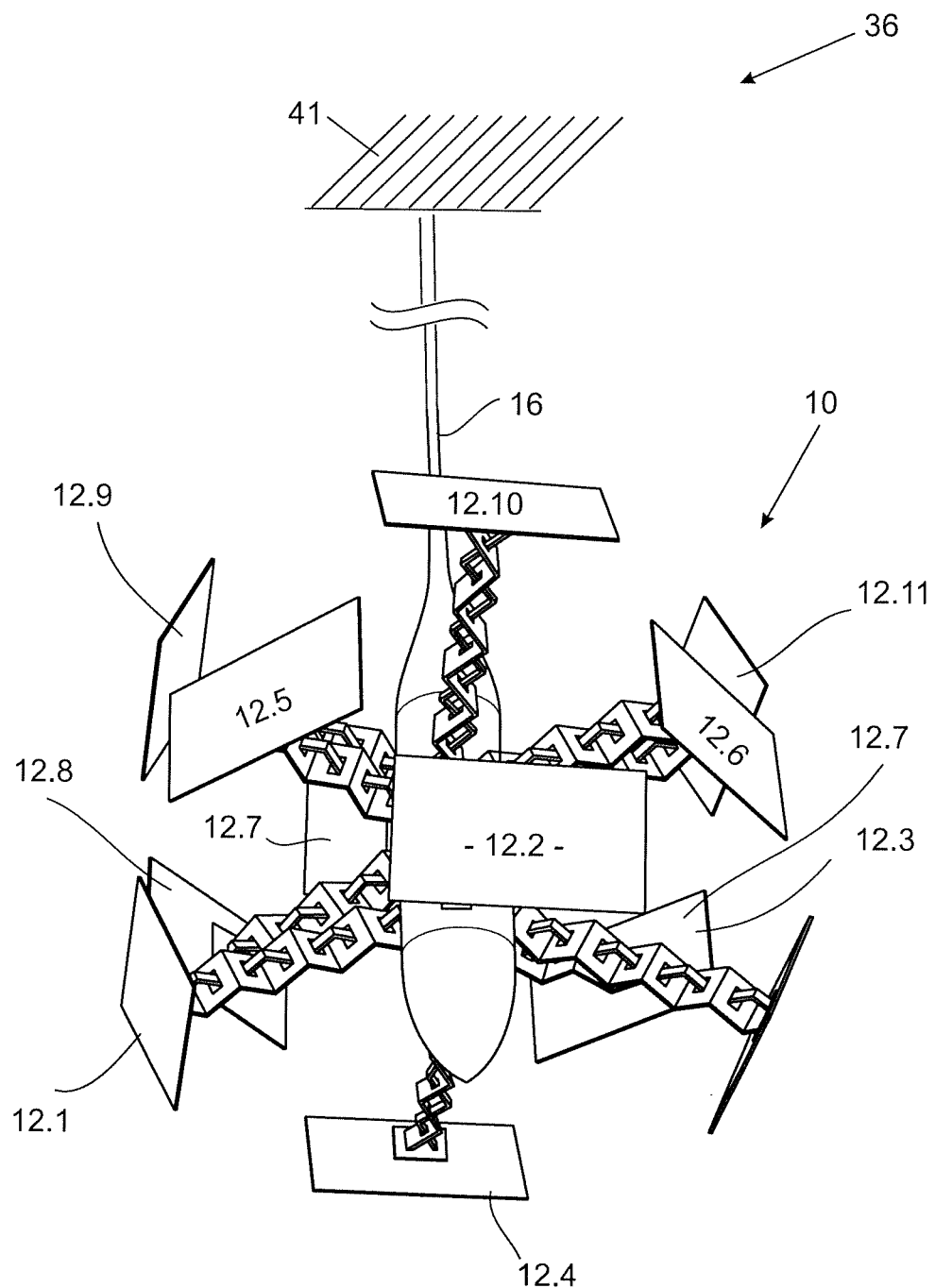

FIG. 4 depicts a perspective view of the monitor system 10 according to the FIGS. 1 to 3.

FIG. 5 shows a partial view of the attachment of the monitor 12.1 to the lazy tong drive 14.1. All monitors are fixed to their respective lazy tong drive in the same way. It shows that a yaw motor 24.1 is available for pivoting the monitor 12.1 about the monitor pivot axis $A_{12}$.

FIG. 5b depicts a schematic view of the lazy tong drive 14.1. FIG. 1 shows that each lazy tong drive 14$i$, for example the lazy tong drive 14.1, comprises a number of tong segments 28.1.1, 28.1.2, ... that are connected to one another such that the can pivot relative to one another. An electric motor 30 moves a thrust rod 32 and a first platform 33.1, which in the present case is in the form of a disc, in an axial direction relative to a second platform 31.1, which is also formed by a disc in the present case. A tong segment—the tong segment 28.1.1 in the present case—is fixed to the first platform 31.1. If the thrust rod 32 is moved forward, the monitor 12.1 moves towards the base 16 (see FIG. 1). A pivot motor 26 allows the pivot angle $\alpha$ of the respective pivot drive to be adjusted.

By adjusting a first axial distance $\Delta z_{1,2}$ between the first platform 31.1 and the second platform 33.1, i.e. a translational movement of the platforms relative to one another, a projection length of the lazy tong drives that are connected to the platforms changes.

All foot sections 15.1 to 15.4 of the lazy tong drives 14.1 to 14.4 of the segment 18.1 are fixed to the platform 33.1. This means that the length of all lazy tong drives 14.1 of the segment 18.1 can be adjusted synchronously, thereby achieving one plane with a single drive. This structure requires constructional safety. Due to the mechanical coupling, all lazy tong drives 14.*i* of the first segment 18.1 are always the same length. Even if the motor 30 fails, an imbalance will still not occur. The lazy tong drives of the segments 18.2 and 18.3 can also be retracted and extended by means of precisely one electric motor.

A second electric motor 34 meshes with a sprocket 35, which is fixed to the base 16. If the second electric motor 34 is activated, the first segment 18.1 rotates.

In order to pivot all lazy tong drives 14.1 to 14.4 of the first segment 18.1 about the same pitch angle α, each foot section 15.*i* of a lazy tong drive 14.1 is fixed to a respective slider 37.1. If a third electric motor 46 rotates a sleeve 42 with external teeth, a second disc 44.1 rotates relative to the first disc 33.1. The slider 37.1 engages at one end, such as a sliding block, with a recess in the second disc 44. The end of the slider 37.1 is moved radially outwards by the recess such that the monitor 12.1 (see FIG. 1) pivots downwards about a horizontal axis $H_{14.1}$. Since all foot sections 15.1 (i=1, . . . , 4) of the lazy tong drives 14.*i* of the first segment 18.1 are fixed in the same way, all monitors 12.1 of the first segment 18.1 pivot downwards about the same pitch angle α.

The lazy tong drives 14.5 to 14.8 of the second segment 18.2 are not capable of conducting a pitching motion. The lazy tong drives 14.9 to 14.12 of the third segment 18.3 have a pitching drive that allows only for an upward movement. This may be configured, for instance, symmetrically to the drive described above for the lazy tong drives 14.1 to 14.4.

FIG. 5*b* shows a schematic image of an electric control unit 39 that is connected to all motors of the segment 18.1 in order to drive it. The control unit 39 comprises a digital memory in which a movement programme—and, where possible, films or images that are to be presented on the monitors 12.*i*—are stored. The control unit 39 is preferably connected to other control units, for example by way of a radio connection. It is also possible for a central electric control unit to be provided, which controls all motors of all segments and the monitors.

Figure 6A:
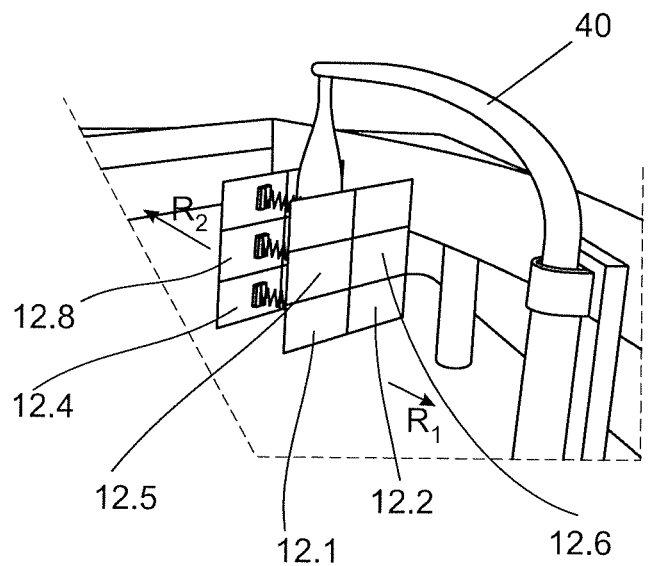
Figure 7:
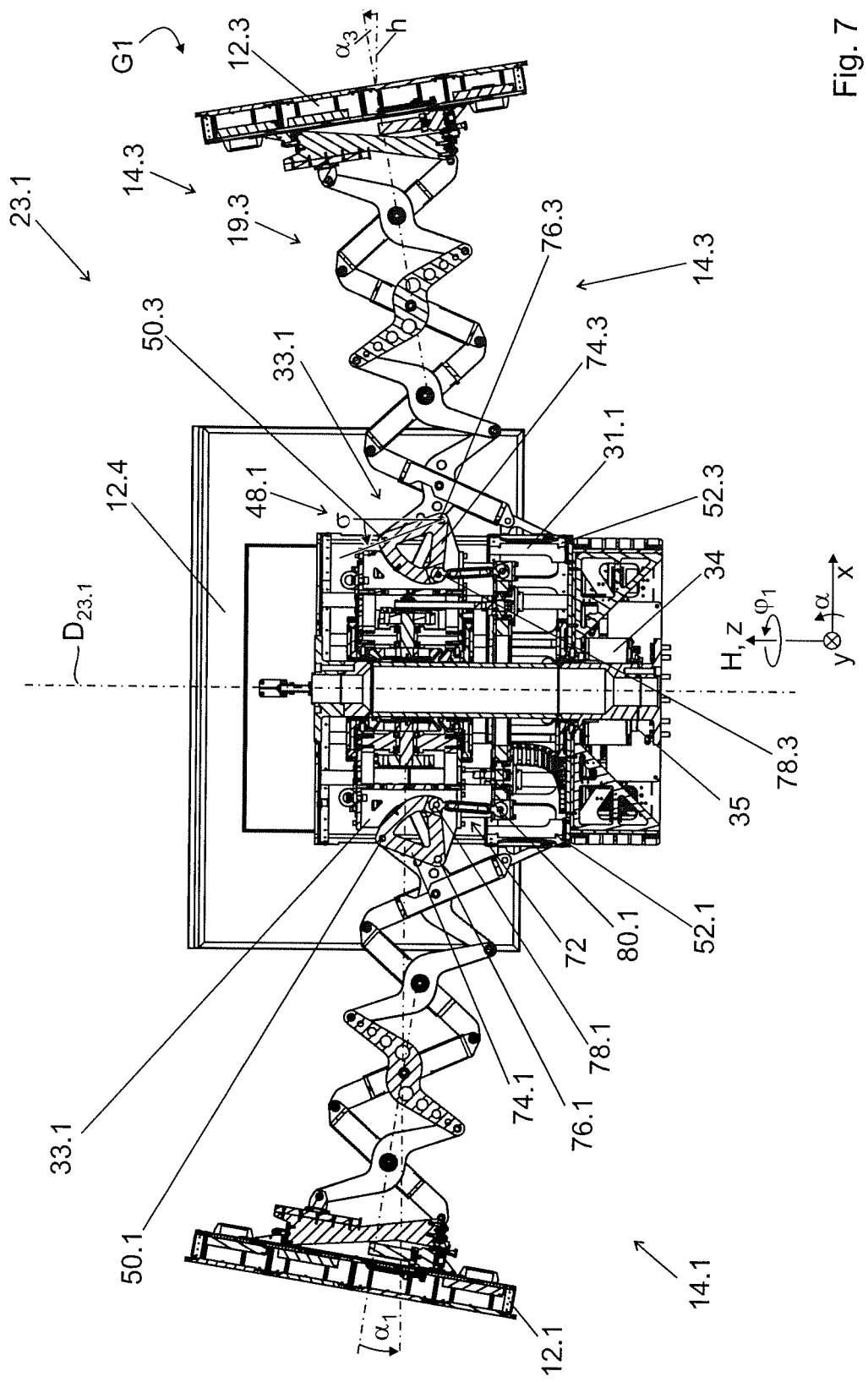

FIG. 6*a* shows the monitors in a first configuration. It should be recognised that 6 monitors form a 2×3 matrix, wherein the monitors 12.1 and 12.2 are arranged side-by-side and point in a first direction R1. The monitors 12.3 and 12.4 point in a second direction R2 that is opposite to the first direction R1; they are also arranged side-by-side. As can be seen in the left-hand partial image in FIG. 3, the lazy tong drives 14.1 and 14.3 each extend in opposite directions. The same applies for the lazy tong drives 14.2 and 14.4.

The monitor system 10 is arranged inside a building 36 and hangs on a mast 40. Alternatively, the monitor system 10—as depicted in FIG. 4—may hang on a ceiling 41 of the building.

Figure 6B:
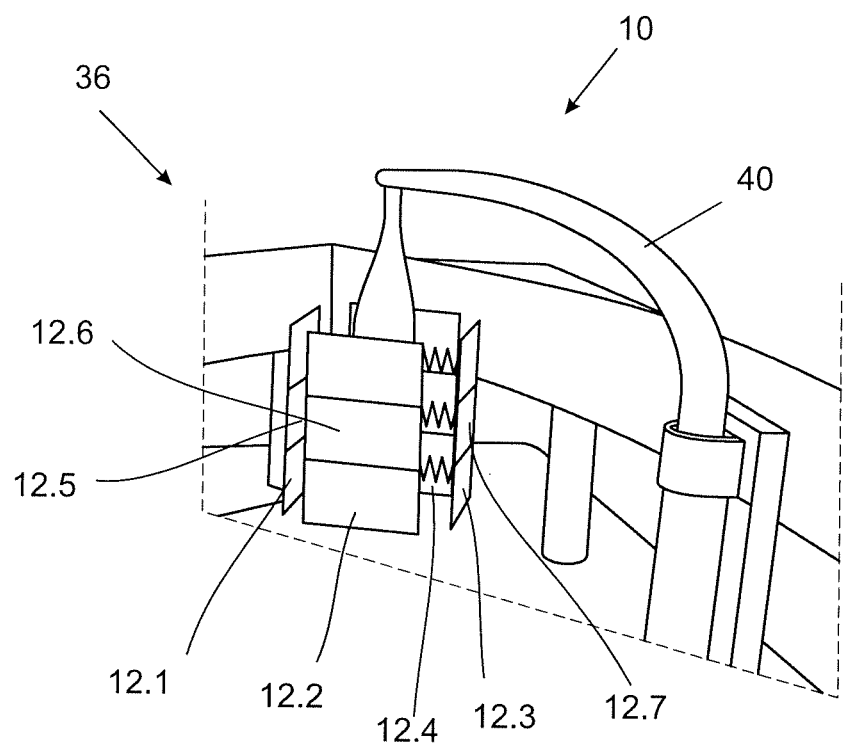

FIG. 6*b* shows a second configuration where three monitors are arranged above one another and together point in one direction. The resulting four directions are perpendicular to each other.

Figure 6C:
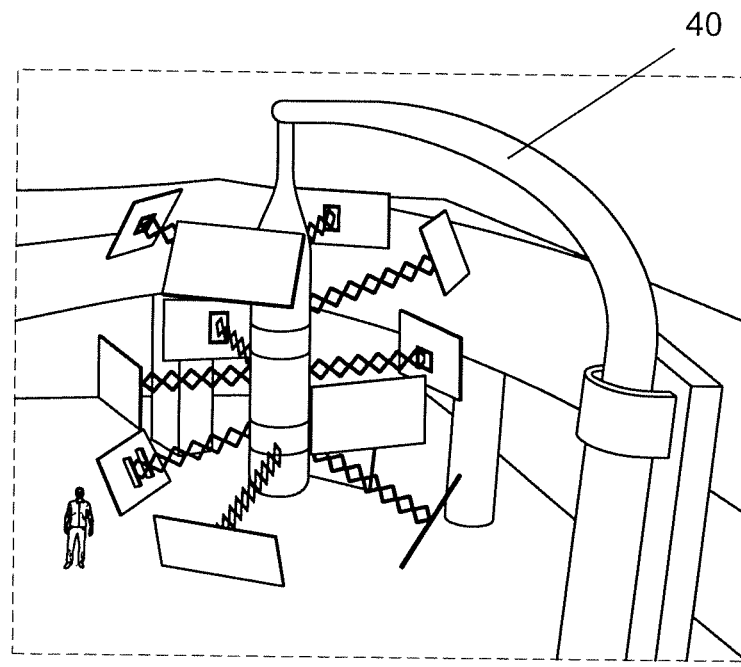

FIG. 6*c* depicts another arrangement in which the lazy tong drives have been extended to the maximum and all monitors point in different directions.

Figure 6D:
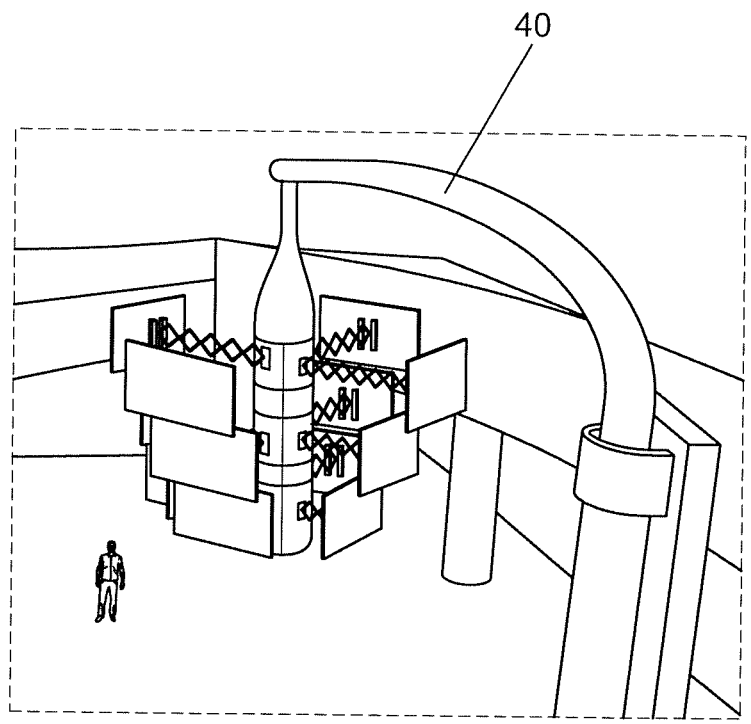

FIG. 6*d* shows a further configuration in which the monitors are each extended further the higher they are arranged.

FIG. 7 shows the segment unit 23.1, which comprises the first group G1 of the monitors 12.1, 12.2, 12.3 and 12.4, wherein the monitor 12.3 is not depicted. All monitors 12.*i* can be rotated about the rotational axis $D_{23.1}$.

The lazy tong drives 14.*i* (i=1, 2, 3, 4) have a common first drive unit 48, explained in more detail below. Since the lazy tong drives 14.*i* are structurally identical, a description of the lazy tong drives that are not depicted is not be provided.

Each lazy tong drive 14.*i* comprises a first foot point 50.*i* that is configured at the proximal end of the respective tong arm 19.*i*. The respective tong arm 19.*i* is fixed to the first platform 33.1 by means of the first foot point 50.*i*. With a second foot point 52.*i*, the first platform 33.1 moves in the axial direction, i.e. along the rotational axes $D_{23.1}$, causing the respective foot points 50.*i*, 52.*i* move away from one another and the corresponding tong arm 19.1 is inserted.

Figure 10:
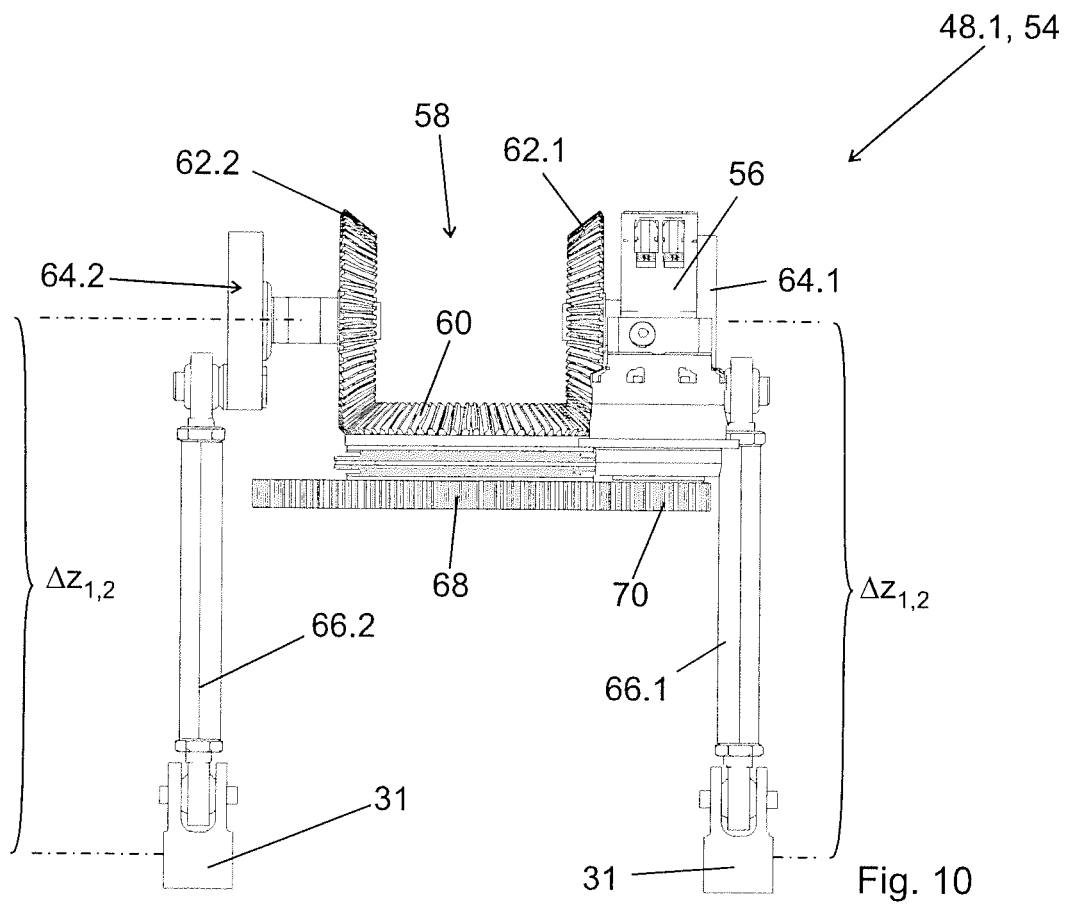

FIG. 10 shows details of the drive unit 48.1, which comprises a first drive in the form of a first crank drive 54. The first crank drive 54 has a first electric motor 56 that is fixed to the first platform 33.1 (see FIG. 7). The first crank drive 54 also comprises a first bevel gear 58 with a first crown gear 60, a first first-crank-drive bevel wheel 62.1 and a second first-crank-drive bevel wheel 62.2. A first first-crank-drive crank 64.1 is rigidly connected to the first first-crank-drive bevel wheel 62.1. A second first-crank-drive crank 64.2 is rigidly connected to the second first-crank-drive bevel wheel 62.2. A first end of a first-crank-drive connecting rod 66.1 or 66.2 is fixed to the respective first-crank-drive cranks 64.1, 64.2. The respective second end is connected to the second platform 31.1.

The first crown gear 60 is driven by a first spur gear 68, which in turn meshes with a drive gearwheel 70 of the first electric motor 56. If the electric motor 56 is activated, the first crown gear 60 and therefore the first-crank-drive cranks 64.1, 64.2 rotate. This causes a first axial distance $\Delta z_{1,2}$ between the first platform 31.1 and the second platform 33.1 to change.

Figure 9:
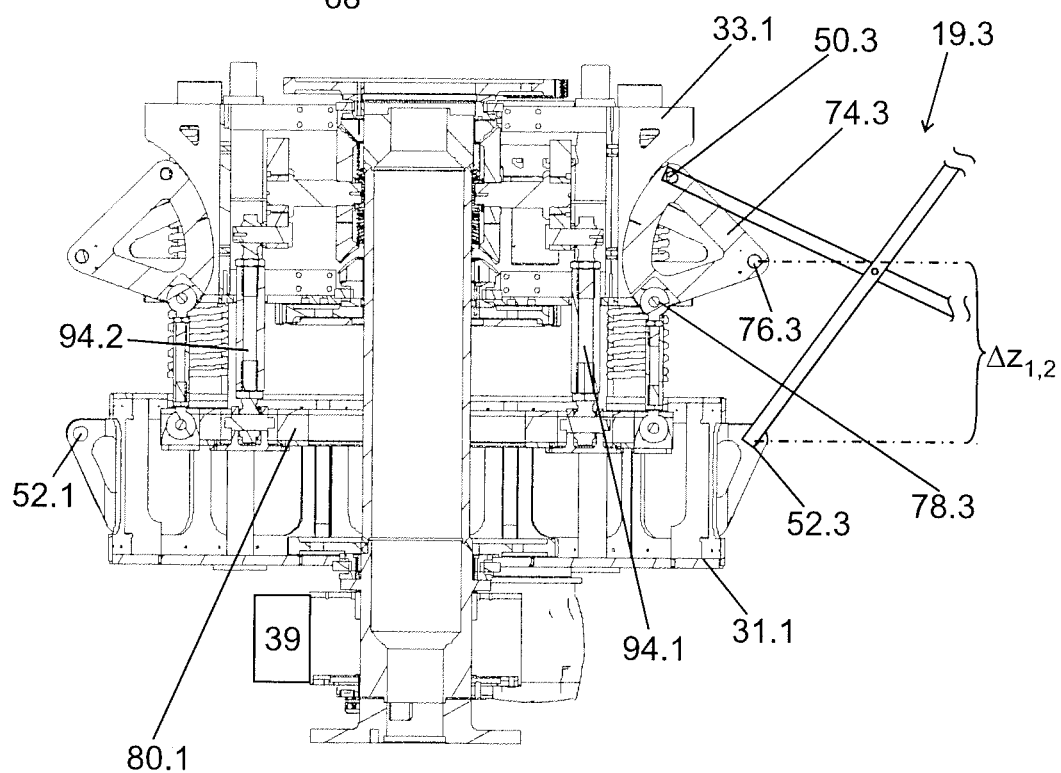

FIG. 9 shows that a change in the axial distance $\Delta z_{1,2}$ causes the projection length of the tong arm 19.*i* to change.

FIG. 7 shows that the first drive unit 48.1 comprises a second drive in the form of a second crank drive 72, by means of which the pivot angle σ of the pivot levers 74.*i* can be changed. The pivot levers 74.*i* are each connected at a first hinge point 76.*i* to the first platform 33.1 such that they can be pivoted. A second hinge point 78.*i* is connected to a third platform 80.1. If the electric motor 56 is activated, the axial position of the hinge point 76.*i* relative to the first platform 31.1 changes.

Figure 11:
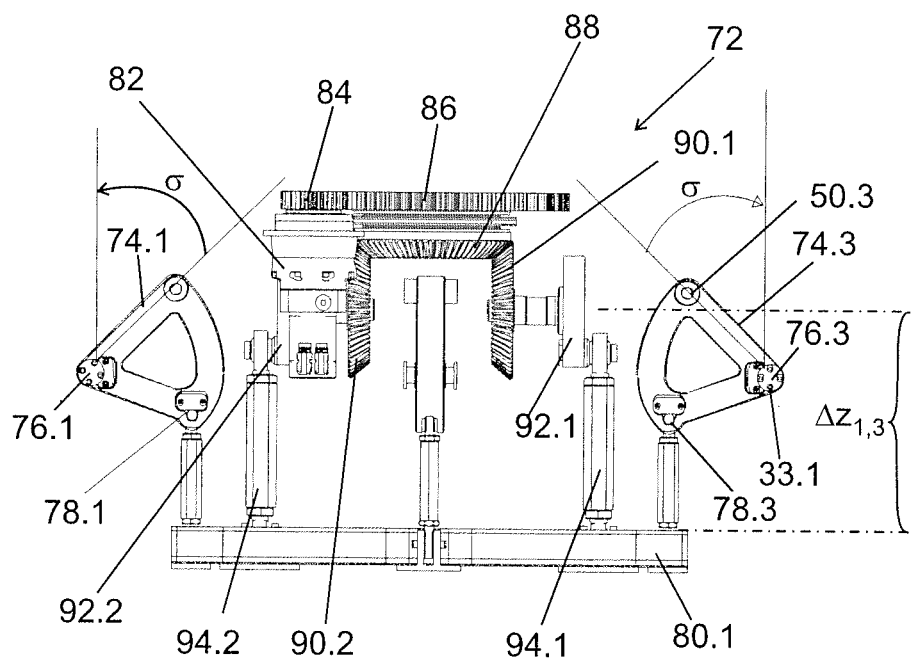

FIG. 11 depicts the second drive 72 in detail. It should be recognised that the second crank drive 72 has a second electric motor 82 that is fixed to the first platform 33.1 (see FIG. 8). A second drive gearwheel 84 of the second electric motor 82 meshes with a second spur gear 86, which is rigidly connected to a second crown gear 88.

The second crown gear 88 meshes with two second-crank-drive bevel wheels 90.1, 90.2, which in turn are connected to the respective second-crank-drive cranks 92.1, 92.2 such that they are torque-proof. The second-crank-drive cranks 92.1, 92.2 are connected to corresponding first ends of second-crank-drive connecting rods 94.1, 94.2, which are connected at their respective second end to the third platform 80.1. If the second spur gear 86 rotates, a second distance $\Delta z_{1,3}$ between the first platform and the third platform 80.1 changes.

Figure 12:
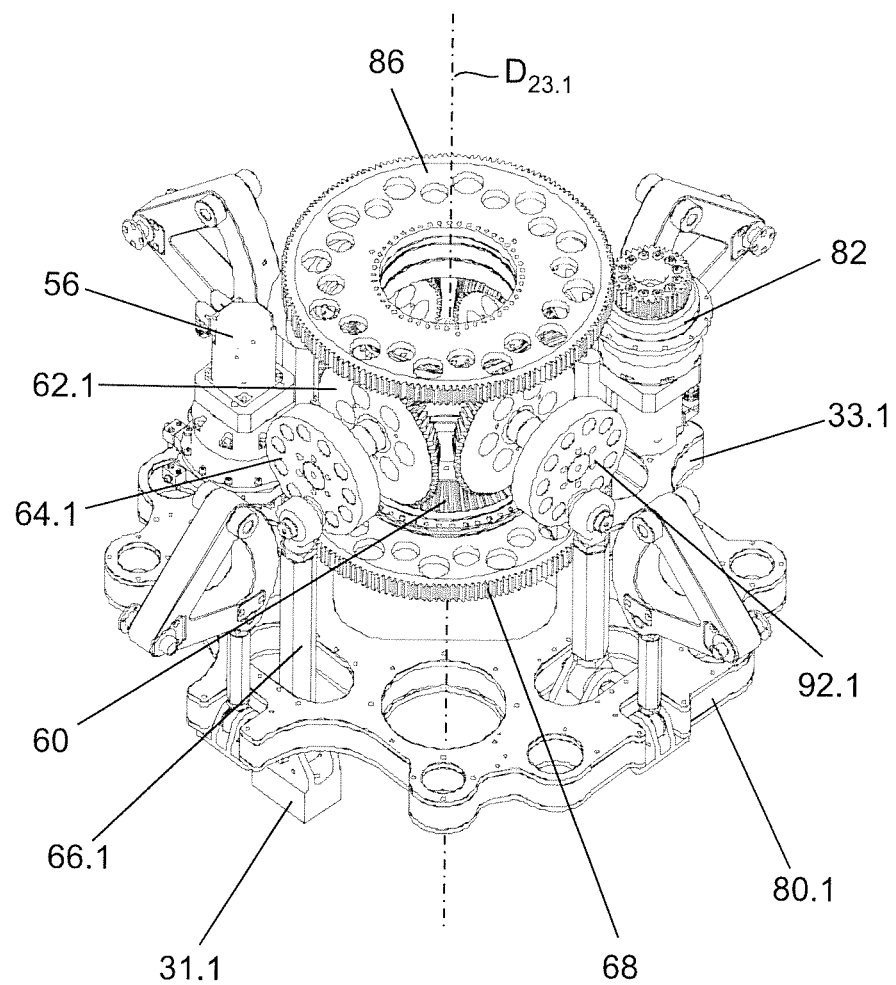

FIG. 12 shows that an activation of the first electric motor 56 causes the spur gear 68 to rotate, which causes the first-crank-drive crank 64.1 and the second first-crank-drive crank, which lies opposite and is not depicted in FIG. 12, to rotate. The second platform 31.1 is configured such that it cannot be moved in the axial direction along the rotational axis $D_{23.1}$. Hence, if the first electric motor 56 is activated, the first platform 33.1 moves downwards in the present case. This results in the extension of the lazy tong drives 14 (see FIG. 7). In contrast, the pitch angle α (see FIG. 1) only changes a little. The first electric motor 56 and the second electric motor 82 are connected to the control unit 39 (see FIG. 9). The control unit is designed such that the extension of the monitors can be executed in a straight line. Furthermore, the control unit is designed such that a pitch motion of the monitors is possible without changing the projection length.

If the second electric motor 82 is activated, the second-crank-drive crank 92.1 and the second second-crank-drive crank 92.2, not depicted in FIG. 12, rotate. This causes the third platform 80.1 to move relative to the first platform 33.1 and the pivot angle σ (see FIG. 7) to change. As a result, the pitch angle α changes and, in the present case, so do the tong lengths. When appropriate movement ranges are selected, this coupling may be used to prevent collisions. The trajectories are calculated by way of kinematics, which enables a de-coupled monitor movement. The pivot drives are preferably designed such that a pitching from the horizontal direction of extension causes an increase in the projection length.

The extreme positions that the platforms can take relative to one another are determined by the top and bottom dead centre points of the cranks 64.1, 64.2, 92.1, 92.2. This enables the determination of the interval of the pitch angles. As depicted in FIG. 1, it is favourable if the monitors in the lowest group, namely the first group G1, can only be pivoted downwards from the horizontal, and the monitors in the top group, namely the third group G3, can only be pivoted upwards. This rules out any collisions occurring between the monitors.

Due to the fact that the crank drives effectively restrict the possible pitch angles α, the monitor system is intrinsically safe. It should be noted that it is possible, but not necessary, for there to be three monitor groups. Specifically, there may also be only one monitor group, but two, three or four monitor groups are also possible.

Figure 8:
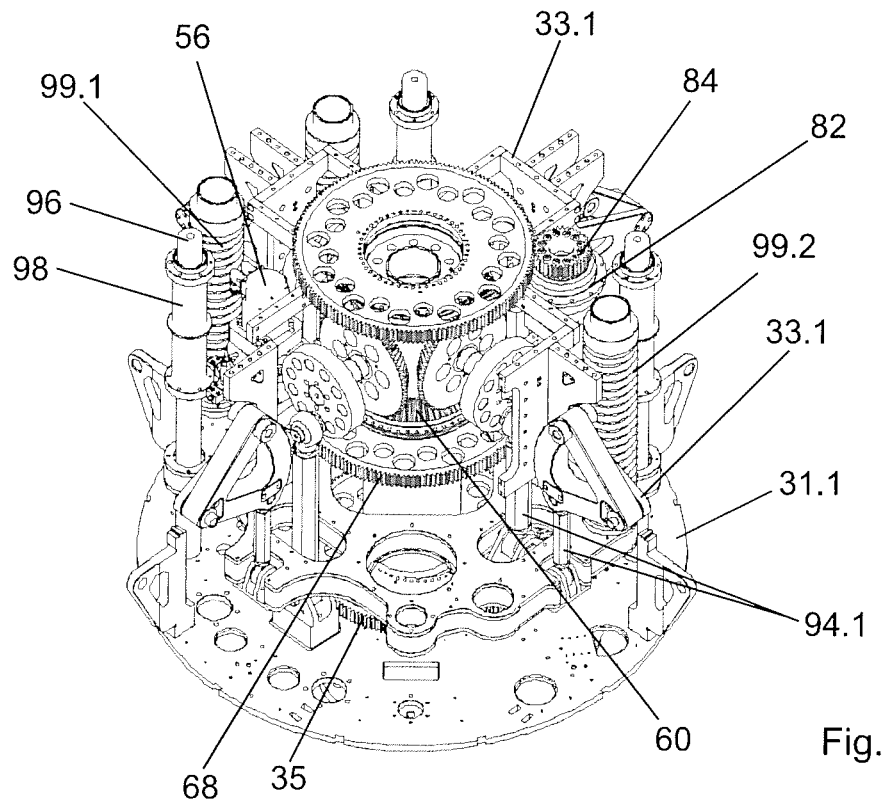

FIG. 8 shows that, by means of a guiding column 96 inside a guiding sleeve 98, the platforms will not twist against each other and only a purely translational movement is possible. Springs 99.1, 99.2 serve as energy stores for a movement of the first platform relative to the third platform and reduce the maximum torque to be generated by the corresponding drives.

Optional additional springs, which are not depicted, serve as energy stores for a movement of the first platform relative to the second platform.

| Reference list: | |
|---|---|
| 10 | monitor system |
| 12 | monitor |
| 14 | lazy tong drive |

| Reference list: | |
|---|---|
| 15 | foot section |
| 16 | base |
| 18 | segment |
| 19 | tong arm |
| 20 | proximal end |
| 22 | distal end |
| 23 | segment unit |
| 24 | yaw motor |
| 26 | pivot drive |
| 28 | tong segment |
| 30 | electric motor |
| 31 | second platform |
| 32 | thrust rod |
| 33 | first platform, disc |
| 34 | second electric motor |
| 35 | sprocket |
| 36 | building |
| 37 | slider |
| 39 | electric control system |
| 40 | mast |
| 41 | ceiling |
| 42 | sleeve |
| 44 | second disc |
| 46 | third electric motor |
| 48 | drive unit |
| 50 | first foot point |
| 52 | second foot point |
| 54 | first drive, first crank drive |
| 56 | first electric motor |
| 58 | first bevel gear |
| 60 | first crown gear |
| 62 | first-crank-drive bevel wheel |
| 64 | first-crank-drive crank |
| 66 | first-crank-drive connecting rod |
| 68 | first spur gear |
| 70 | drive gearwheel |
| 72 | second drive, second crank drive |
| 74 | pivot lever |
| 76 | first hinge point |
| 78 | second hinge point |
| 80 | third platform |
| 82 | second electric motor |
| 84 | second drive gearwheel |
| 86 | second spur gear |
| 88 | second crown gear |
| 90 | second-crank-drive bevel wheel |
| 92 | second-crank-drive crank |
| 94 | second-crank-drive connecting rod |
| 96 | guiding column |
| 98 | guiding sleeve |
| α | pitch angle |
| β | yaw angle |
| φ | rotational angle |
| σ | pivot angle |
| $\Delta z_{1,2}$ | first axial distance |
| $\Delta z_{1,3}$ | second axial distance |
| $A_{12}$ | monitor pivot axis |
| $D_{18}$ | vertical axis, segment rotational axis |
| G | grouph horizontal |
| H | axial height |
| $H_{14.i}$ | horizontal axis |
| i, j | running index |
| $L_0$ | overall length |
| N | number of monitors |
| r | longitudinal direction, radial direction |
| R | direction |
| S | centre of gravity |

The invention claimed is:

1. A monitor system, comprising:
a first monitor,
a second monitor,
a third monitor,
at least a fourth monitor, and
a base,
a motor, wherein
said first monitor, said second monitor, said third monitor, and said at least a fourth monitor are fixed to the base and are moveable by the motor in at least two degrees of freedom, and said first monitor, said second monitor, said third monitor, and said at least a fourth monitor are fixed to the base by lazy tong drives.

2. The monitor system according to claim 1,
wherein each lazy tong drive has a tong arm
which is fixed to the base at a proximal end, and
comprises a distal end to which one of said first monitor, said second monitor, said third monitor, and said at least a fourth monitor is fixed.

3. The monitor system of claim 2 wherein one of said first monitor, said second monitor, said third monitor, and said at least a fourth monitor is fixed to the base in a way that the one of said first monitor, said second monitor, said third monitor, and said at least a fourth monitor can pivot about a monitor pivot axis.

4. The monitor system according to claim 1 wherein at least one monitor of said first monitor, said second monitor, said third monitor, and said at least a fourth monitor is fixed to the base such that it can be rotated by the lazy tong drives about a horizontal pivot drive pivot axis.

5. The monitor system according to claim 1 wherein said at least a fourth monitor includes fourth, fifth, sixth, seventh, eighth, ninth, tenth, eleventh, and twelfth monitors,
wherein a first monitor group which includes at least three of the first, second, third, and fourth monitors that are fixed to the base such that they can be collectively rotated,
wherein a second monitor group which includes at least three of the fifth, sixth, seventh, and eighth monitors that are fixed to the base such that they can be collectively rotated, and
wherein a third monitor group which includes with at least three of the ninth, tenth, eleventh, and twelfth monitors that are fixed to the base such that they can be collectively rotated,
wherein the monitor system further comprises
a first segment
that is fixed to the base such that it can be automatically rotated about a vertical axis, and
to which each of the first, second, third, and fourth monitors in the first monitor group are fixed,
a second segment
that is fixed to the base such that it can be automatically rotated about the vertical axis,
to which each of the fifth, sixth, seventh, and eighth monitors in the second monitor group are fixed, and
wherein the second segment is arranged above the first segment, and
a third segment,
that is fixed to the base such that it can be rotated about the vertical axis,
to which each of the ninth, tenth, eleventh, and twelfth monitors in the third monitor group are fixed, and
wherein the third segment is arranged above the second segment.

6. The monitor system according to claim 5 further comprising an electric control unit designed to:
(i) move one or more of first, second, third, fourth, fifth, sixth, seventh, eighth, ninth, tenth, eleventh, and twelfth monitors from a first configuration into a second configuration and/or
(ii) rotate at least one of the first segment, second segment and third segment about the vertical axis.

7. The monitor system according to claim 5 wherein when in a first configuration, in at least one monitor group selected from the first monitor group, the second monitor group, and the third monitor group
at least two of the first second third fourth fifth sixth seventh eighth, ninth, tenth, eleventh and twelfth monitors are arranged side-by-side, wherein said at least two monitors point in a first direction,
at least two other monitors selected from said first second third fourth, fifth, sixth, seventh, eighth, ninth, tenth, eleventh, and twelfth monitors are arranged side-by-side, wherein said at least two other monitors point in a second direction that is opposite to the first direction.

8. The monitor system according to claim 5 wherein the first, second, third, fourth, fifth, sixth, seventh, eighth, ninth, tenth, eleventh, and twelfth monitors are rigidly fixed to the base in terms of a rotational movement about a horizontal roll axis.

9. The monitor system according to claim 5 wherein the lazy tong drives include first, second, third, and fourth lazy tong drives for each of the first monitor group, second monitor group, and third monitor group, and
when in a first configuration, in at least one monitor group selected from the first monitor group, the second monitor group, and the third monitor group
the first lazy tong drive fixes the first monitor and the third lazy tong drive fixes the third monitor in said a least one monitor group, and the first and third lazy tong drives extend in opposite directions, and
the second lazy tong drive fixes the second monitor and the fourth lazy tong drive fixes the fourth monitor in said at least one monitor group, and the second and fourth lazy tong drives extend in opposite directions, and
wherein the first, second, third, and fourth lazy tong drives are moveable between a retracted position and an extended position, and are in the retracted position when in the first configuration.

10. The monitor system according to claim 9 wherein when in the retracted position, the first, second, third, and fourth lazy tong drives have an overall length, wherein the monitor system further comprises at least one yaw motor for yawing at least one monitor selected from said first, second, thirds fourth, fifth, sixth, seventh, eighth, ninth, tenth, eleventh and twelfth monitors about a monitor pivot axis, and the overall length and an angle range of the at least one yaw motor are configured such that any contact between two adjacent monitors in a monitor group of the first, second and third monitor groups, regardless of a yaw position relative to the monitor pivot axis, is ruled out.

11. The monitor system according to claim 1 wherein each of the first, second, third, and a fourth monitors are in the first monitor group and are assembled such that they are rotatable about a common segment rotational axis and
wherein said lazy tong drives include first, second, third, and fourth lazy tong drives,
wherein each of the first, second, third, and fourth monitors are movable respectively by said first, second, third, and fourth lazy tong drive,
wherein each of the first, second, third, and fourth lazy tong drives have a common first drive unit.

12. The monitor system according to claim 11, wherein the first drive unit has a first drive which adjusts a first axial distance of a first platform from a second platform, and
each of the first, second, third, and fourth lazy tong drives are connected to the first platform at a first foot point of a respective first, second, third, and fourth tong arm, and to the second platform at a second foot point of their respective first, second, third, and fourth tong arm such that the respective first, second, third, and fourth tong arms can be retracted and extended by means of the first drive.

13. The monitor system of claim 12 wherein the first drive is a crank drive.

14. The monitor system according to claim 11 wherein
each of the first, second, third, and fourth tong arms are connected to a first platform at their respective foot point by a pivot lever,
wherein the first drive unit comprises a second drive which pivots a pivot angle of the pivot lever to adjust the first, second, third, and fourth lazy tong drives so that the first, second, third and fourth lazy tong drives may be collectively pivoted about a pitch angle.

15. The monitor system of claim 14 wherein either or both the first drive and the second drive is a crank drive.

16. The monitor system according to claim 14, further comprising
a third platform,
wherein each said pivot lever is hinged to the third platform,
wherein the second drive is configured to adjust a second axial distance between the third platform and the first platform, and
wherein the pivot angle can be adjusted by changing the second axial distance.

17. The monitor system according to claim 11 wherein the first lazy tong drive is a
first crank drive which has
(i) a first electric motor which is fixed to a first platform,
(ii) a first bevel gear with
a first crown gear,
a first first-crank-drive bevel wheel, and
a second first-crank-drive bevel wheel,
(iii) a first first-crank-drive crank is rigidly connected to the first first-crank-drive bevel wheel, and
(iv) a second first-crank-drive crank, which is rigidly connected to the first first-crank-drive bevel wheel, has
(v) a first first-crank-drive connecting rod that is connected at a first end to the first first-crank-drive crank and at a second end to a second platform, and
(vi) a second first-crank-drive connecting rod that is connected at a first end to the second first-crank-drive crank and at a second end to the second platform, and wherein the first electric motor is connected to the first crown gear for driving the monitor system such that the first-crank-drive crank can be rotated by the first electric motor, and
wherein the first-crank-drive cranks are connected to the respective bevel wheels such that the first first-crank-drive crank is at its top dead center point when the second first-crank-drive crank is at its top dead center point, and that the first first-crank-drive crank is at its bottom dead center point when the second first-crank-drive crank is at its bottom dead center point.

18. The monitor system according to claim 17,
wherein the first drive unit has a second crank drive, and the second crank drive has
(i) a second electric motor,
(ii) a second bevel gear with
a second crown gear,
a first second-crank-drive bevel wheel and
a second second-crank-drive bevel wheel,
(iii) a first second-crank-drive crank is rigidly connected to the first second-crank-drive bevel wheel, and
(iv) a second second-crank-drive crank, which is rigidly connected to the second second-crank-drive bevel wheel, has
(v) a first second-crank-drive connecting rod
connected at a first end to the first second-crank-drive crank and at a second end to a third platform, and
(vi) a second second-crank-drive connecting rod connected at a first end to the second second-crank-drive crank and at a second end to the third platform, and
wherein the second electric motor is connected to the first crown gear for driving the monitor system such that the second-crank-drive cranks can be rotated by the second electric motor, and
wherein the second-crank-drive cranks are connected to the respective bevel wheels such that the first second-crank-drive crank is at its top dead center point when the second second-crank-drive crank is at its top dead center point, and that the first second-crank-drive crank is at its bottom dead center point when the second second-crank-drive crank is at its bottom dead center point.

19. A building having a ceiling or mast or foot, wherein the building has a monitor system according to claim 1 which hangs on a ceiling or to a mast or is fixed to a foot that is located on the base.

* * * * *